US009648391B2

(12) United States Patent
Ruiz Alonso et al.

(10) Patent No.: US 9,648,391 B2
(45) Date of Patent: May 9, 2017

(54) MULTIMEDIA CONTENT BROADCAST PROCEDURE

(75) Inventors: Jaime Ruiz Alonso, Madrid (ES);
Pablo Pérez Garcia, Madrid (ES);
Alvaro Villegas Nuñez, Madrid (ES)

(73) Assignee: Alcatel Lucent, Boulogne-Billancourt (FR)

( * ) Notice: Subject to any disclaimer, the term of this patent is extended or adjusted under 35 U.S.C. 154(b) by 589 days.

(21) Appl. No.: 13/640,154

(22) PCT Filed: Apr. 8, 2011

(86) PCT No.: PCT/EP2011/055489
§ 371 (c)(1),
(2), (4) Date: Jan. 31, 2013

(87) PCT Pub. No.: WO2011/124673
PCT Pub. Date: Oct. 13, 2011

(65) Prior Publication Data
US 2013/0125189 A1    May 16, 2013

(30) Foreign Application Priority Data

Apr. 9, 2010  (EP) .................................... 10382080

(51) Int. Cl.
*H04N 7/173* (2011.01)
*H04N 21/60* (2011.01)
*H04L 1/18* (2006.01)
*H04L 12/18* (2006.01)
*H04L 29/06* (2006.01)
*H04L 1/00* (2006.01)

(52) U.S. Cl.
CPC .......... *H04N 21/60* (2013.01); *H04L 1/1877* (2013.01); *H04L 12/1868* (2013.01); *H04L 65/4076* (2013.01); *H04L 2001/0093* (2013.01)

(58) Field of Classification Search
USPC .................................................. 725/116, 118
See application file for complete search history.

(56) References Cited

U.S. PATENT DOCUMENTS 7,315,898 B2 * 1/2008 Kohno .......................... 709/230
8,311,128 B2 * 11/2012 Le Floch et al. ........ 375/240.27
(Continued)

OTHER PUBLICATIONS

International Search Report for PCT/EP2011/055489 dated Jun. 16, 2011.

*Primary Examiner* — Mushfikh Alam
(74) *Attorney, Agent, or Firm* — Fay Sharpe, LLP

(57) ABSTRACT

A procedure to broadcast digital multimedia contents to subscribers, where a first digital data transport stream broadcast to subscribers from a head end (12) via a first telecommunications network other than a telecommunications network based on an Internet IP protocol is received in a customer device (15); transmission from a first retransmission unit (153) of a lost packet petition message to a second retransmission unit (132) contained in a service application unit (13) connectable to the customer device (15) via a second telecommunications network (11) based on an Internet IP protocol; in response to the lost packet petition message from the first data transport stream, transmission of a second digital data stream that comprises at least one packet lost form the first digital data transport stream.

13 Claims, 1 Drawing Sheet

(56) References Cited

U.S. PATENT DOCUMENTS

| | | | |
|---|---|---|---|
| 2003/0121053 A1* | 6/2003 | Honda | 725/107 |
| 2007/0223535 A1* | 9/2007 | Hamazaki | 370/486 |
| 2008/0109865 A1* | 5/2008 | Su et al. | 725/116 |
| 2009/0089640 A1 | 4/2009 | Tsuji et al. | |
| 2009/0328237 A1* | 12/2009 | Rodriguez et al. | 726/32 |
| 2010/0050042 A1 | 2/2010 | White | |
| 2011/0134930 A1* | 6/2011 | McLaren et al. | 370/401 |
| 2012/0278845 A1* | 11/2012 | Ou | 725/93 |
| 2013/0007823 A1* | 1/2013 | Mangs | H04L 1/0061 725/109 |

\* cited by examiner

MULTIMEDIA CONTENT BROADCAST PROCEDURE

FIELD OF INVENTION

This invention refers in general to a procedure to broadcast multimedia contents to a subscriber and a service application medium that executes this procedure.

BACKGROUND

At present, it is a known fact that a radio and TV signal digital information services transmission or broadcast operator can broadcast the digital TV and radio channels via a TV transport network based on satellite, cable, digital terrestrial, etc. to a group of end subscribers of the digital service broadcast system.

The audiovisual contents and information associated with radio and TV services are produced or collected in a head end, where they are compressed, multiplexed and adapted to the transport network, which will carry them to the end users.

Consequently, the distribution of digital radio and TV signals in accordance with standards such as MPEG, DVB and ATSC enables end customers to access TV services that are generally of a higher quality than equivalent TV services provided via analog TV services.

However, if the quality of the stream recovered or decoded in a customer device from a digital data stream received from the head end does not exceed a predetermined quality threshold, the consequences are worse than in an equivalent situation in the analog system, i.e., an audiovisual receiver connected to the customer device shows a screen with a distorted signal, black screen or screen without signal when a decoder of the customer device cannot decode the received data transport stream and/or it supplies an incomplete decoded stream as a result of the fact that not all data packets of the transport stream are received by the customer device decoder.

The aforesaid drawback affects all kinds of broadcast technologies, e.g. via cable, via satellite and terrestrial, and it is especially noticeable in the case of the broadcast of digital terrestrial television (DTT).

American patent application US 2010/0050042 A1, included herein for reference, refers to a TV broadcast procedure based on an Internet IPTV protocol which combines techniques of forward error correction with techniques of retransmission to handle lost and/or corrupted data packets associated with digital multimedia channels broadcast over an Internet IP protocol-based telecommunications network.

In the procedure referred to above, the end customers receive the channels with digital multimedia audiovisual contents over an IP network.

However, the aforesaid drawback is still not eliminated and/or diminished in the event that the audiovisual contents are broadcast via a transport network other than an IP network; for this scenario, the subscriber experience is inferior to the experience of a subscriber of an analog TV broadcast system.

SUMMARY

This invention seeks to resolve or diminish one or more of the drawbacks explained above by means of a procedure to transmit multimedia contents to a subscriber as defined in the claims.

One embodiment of the procedure to broadcast digital multimedia contents to subscribers comprises the reception in a customer device of a first transport stream of digital data broadcast to subscribers from a head end via a first telecommunications network other than a telecommunications network based on an Internet IP protocol; the playback in the subscriber audiovisual receiver of a program recovered by a decoder unit and supplied to a first storage unit connected to the receiver; the detection in the customer device of the loss of one or more packets in the first stream received via the first telecommunications network; the transmission from a first retransmission unit of a packet loss message to a second retransmission unit comprising a service application unit connectable to the customer device via a second telecommunications network based on an Internet IP protocol; in response to the packet loss petition message of a packet of the first data transport stream received by the customer device and the transmission of a second digital data stream that comprises the lost packets.

Independently of the above, the head end broadcasts this same first digital data stream to all the customer devices via the first transport network selected and also to a service application medium that comprises a third storage unit, so that it will store the first digital data transport stream broadcast from the head end.

The decoder unit decodes the first digital data transport stream and the second data stream received to recover the multimedia contents or program of the selected channel and supplies it via the first storage unit to the audiovisual screen of the subscriber.

The multimedia contents are coded according to a coding standard such as MPEG2 for transport via a transport network, such that the multimedia contents are digitally coded to form a digital data stream generated, for example, as per standard MPEG2.

It should also be noted that the server must have enough storage capacity to store several seconds of each of the channels broadcast from the head end.

The decoder unit detects the loss of a packet by tracking the continuity counters (CC) of the head end of the MPEG2 transport packets. Each continuity counter is increased by one unit for consecutive packets that contain the same packetized identifier (PID). There is a separate continuity counter for each different type of packetized identifier PID of the MPEG2 transport stream.

Although the resolution of the continuity counters is low—4 bits or 16 different values—the parallel tracking of their value for all the active packetized identifiers PID in the MPEG2 stream ensures, with a sufficient margin of error, the detection of the absence of transport packets in the received stream, i.e., first transport stream.

To request the retransmission of unreceived packets, the packets before and after the unreceived packets must be identified, such that the retransmission server will only send the required packets, i.e., those packets lost from the contents of a selected channel.

The packet identification step is done by a mechanism that generates labels or digital fingerprints, executed on each MPEG2 transport packet, such that, in the message sent to the retransmission server, the digital fingerprints of the packets before and after an unreceived data packet are included.

BRIEF DESCRIPTION OF THE FIGURES

A more detailed explanation of devices and/or methods as per the embodiments of the invention is provided in the following description, based on the accompanying figures where.

DESCRIPTION OF EMBODIMENTS

Figure 1:
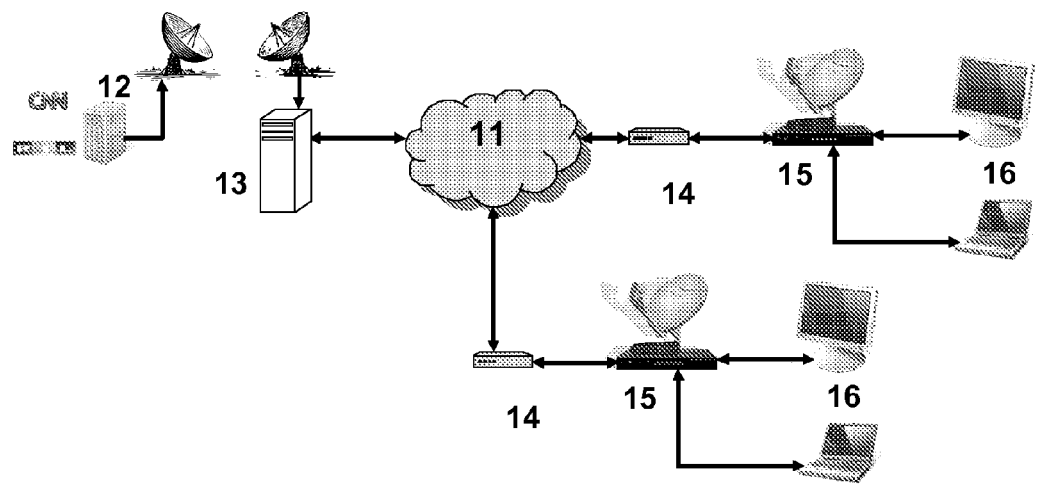
FIG. 1 is a diagram of a TV broadcast system.

FIG. 1 shows a radio and TV signal digital information services broadcast system where a TV and radio head end 12 receives different types of multimedia audiovisual contents associated with communication channels of various multimedia content providers CNN, RTL, etc., to compress and/or code, multiplex and adapt the received multimedia audiovisual contents so they can be transported as a first digital data transport stream via a first telecommunications network other than an Internet IP protocol-based network to end users or subscribers.

Figure 2:
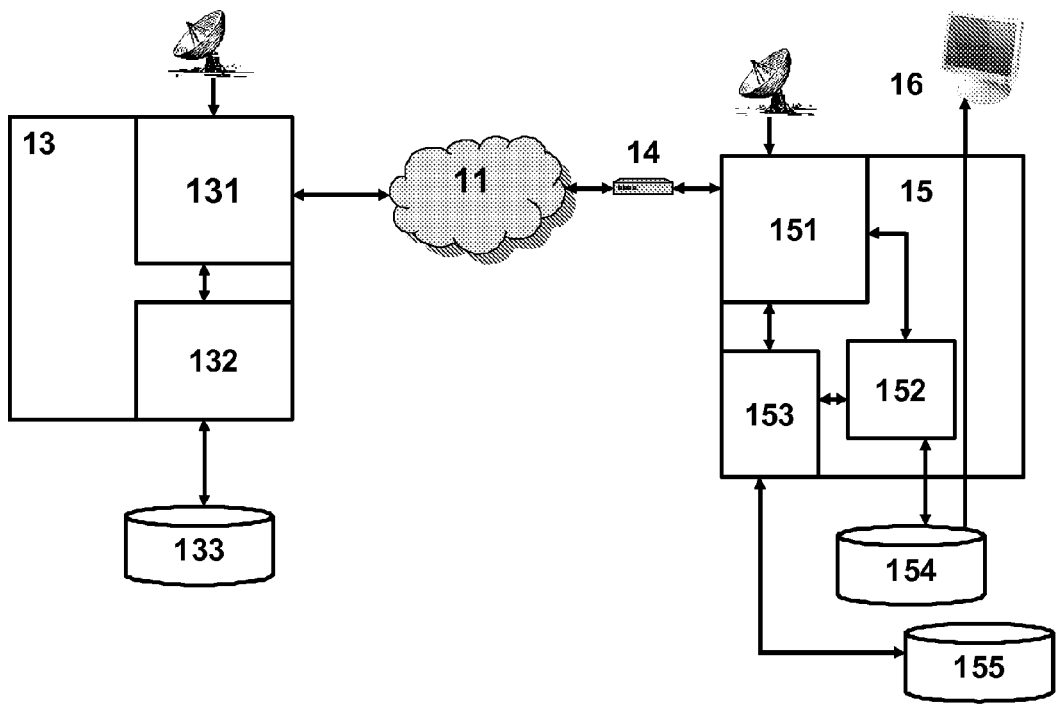
FIG. 2 schematically shows a block diagram of an embodiment.

Referring now to FIG. 2, the head end 12 of a telecommunications operator broadcasts the first digital data transport stream via the first transport network in unidirectional mode to a multitude of subscribers.

The multimedia audiovisual contents received by the head end 12 are coded as per a coding standard for audio, video and data, e.g., MPEG2 video or H.264, for transport via the selected telecommunications network, such that the multimedia contents are digitally coded by the head end 12, thus generating and broadcasting the first digital data stream as per the selected coding standard.

The subscriber receives the first data transport stream by means of a customer device 15, e.g., a decoder interface of the set-top box type, which comprises a first input/output unit 151 that receives the first broadcast transport stream and forwards it to a decoder unit 152 so that it will supply the decoded multimedia audiovisual contents of a selected channel to a subscriber receiver 16 such as a multimedia audiovisual screen.

The decoder interface 15 also comprises a first customer retransmission unit 153 that can be connected to the first input/output unit 151 to receive the first transport stream and can also be connected to the decoder unit 152 of the customer device 15.

The first input/output unit 151 forwards the first transport stream in parallel to the first retransmission unit 153 and to the decoder 152.

In turn, the first retransmission unit 153 can be connected to a services application medium 13 or server through the first input/output unit 151 connected to a gateway device 14 via a second telecommunications network 11 of the Internet IP protocol type and to a second retransmission unit 132 via a second input/output unit 131 included in the server 13.

Likewise, the server 13 receives the first digital data transport stream broadcast from the head end 12 via the second input/output unit 131.

The second retransmission unit 132 receives the first transport stream broadcast from the TV head end 12 and petition messages sent from the first retransmission unit 153 via the second input/output unit 131, but through different types of transport networks, respectively.

The server 13 also includes a third storage unit 133 of the circular buffer type to store, during a certain period of time, the first transport stream, e.g., corresponding to the content or elementary streams as per coding standard MPEG-2, of each of the programs of the different channels broadcast from the head end 12 via the first transport network both to the end subscribers and to the server 13.

The third storage unit 133 stores the first digital data transport stream broadcast from the head end 12 via the first telecommunications network, to be able to perform tasks of identification of the data packets corresponding to the different contents of the channels transported via the first data stream received by the server 13 and stored in the third buffer 133.

The first retransmission unit 153, as it receives the first transport stream of, for example, type MPEG2-TS, performs control and supervision tasks to check that all the transport stream packets have been received and, consequently, that decoder 152 can reconstruct the received information so that it can be supplied to the subscriber receiver 16.

To perform the aforesaid task of detecting gaps or the loss of a packet, the first retransmission unit 153 executes a lost and/or corrupted packet detection procedure, which can be done by tracking the continuity counter CC of each received transport packet, as this count is increased by one unit in a transport packet consecutive to a previous packet transported by the first transport stream.

Therefore, whenever the transport stream transports a packet of the same program component, the packetized identifier PID is increased by one unit with respect to a previous packet corresponding to the same component.

Consequently, the first retransmission unit 153 is able to detect, based on the continuity counter count, if a transport stream packet has been lost by tracking the numeric value of the continuity counter CC count of each transport packet.

Therefore, the first retransmission unit 153, in parallel with the decoding of the transport stream, also tracks the numeric value of the continuity counter CC count to control the reception of all the packetized identifiers PID corresponding to all the content packets of the selected channel.

A jump or gap in the continuity counter CC count between two transport packets received consecutively and corresponding to the same program component indicates the loss of a transport stream packet. Consequently, the decoder 152 may supply an incomplete signal to the subscriber receiver 16 if it is not received before the decoded content is supplied to the subscriber receiver 16 from a first storage unit 154.

In the aforesaid scenario in which at least one packet is not received, the first retransmission unit 153 can determine the packet that has not been received of the content or program corresponding to the selected channel by tracking the numeric value of the detected continuity counter CC count. A data packet is not received if a gap is detected in the continuity counter of two data packets received consecutively and corresponding to the same program component.

The control of lost packets based on supervision of the continuity counter CC is not very accurate or precise because of the low counter resolution. However, if this supervision is done in parallel in all the program components with different program identifiers PID, each program is assigned a different packetized identifier PID; this significantly boosts the effectiveness of detection, thus making the detection of the loss of packets transported by the first transport stream an easy, rapid and uncomplicated task.

In a scenario where the first retransmission unit 153 detects the absence of a packet, it generates and sends a lost packet petition message to the second retransmission unit 132 which, in response to the received petition message, retrieves the lost packet from the third storage unit 133 and sends it over the second IP network 11 to the first retransmission unit 153 which, in turn, forwards it to the decoder 152 so that the decoder can decode the packets that it has not received via the first transport network, corresponding to the program of the selected channel that is being shown to the subscriber via the receiver 16.

The first retransmission unit 153 applies an MPEG2 transport packet identification procedure of the digital fingerprint algorithm type that can be easily implemented and is very efficient in the case of MPEG2 transport packets.

The first retransmission unit extracts the packetized identifier PID, the numeric value of the continuity counter CC and the first bits of the payload from the bytes 1 to 4 of a received packet, to generate a label or digital fingerprint for each MPEG2 transport packet.

Therefore, the aforesaid digital fingerprint corresponding to each MPEG2 transport packet that is generated is stored in a second storage unit 155 for several seconds or minutes, since the digital fingerprint comprising 16 bits is a good individual identifier of each MPEG2 transport packet received in the decoder 152.

It should be noted that the first byte—byte 0—of the packet is not used to generate the label or digital fingerprint of each packet received from the first data stream.

When the first retransmission unit detects a gap in the numeric value of the continuity counter CC, it generates a petition message that comprises the digital fingerprints of several packets correctly received before the lost packet and the digital fingerprints of several packets correctly received after the lost packet.

Similarly, the second retransmission unit 132 uses the same labelling or digital fingerprint procedure used by the first retransmission unit 153 to identify each MPEG2 transport packet received from the head end. The digital fingerprint generated by the second retransmission unit 132 is stored in the third storage unit 133 together with the first data stream.

Consequently, each packet of the first stream received in the server 13 and in customer device 15 will be assigned a single digital fingerprint identifier which comprises a short sequence of bits.

It should be noted that the third storage unit 133 must have enough storage capacity to store several seconds or minutes of each of the channels broadcast from the head end 12, as well as the generated digital fingerprints.

When the first retransmission unit 153 detects the loss of a packet, it retrieves a predetermined number of digital fingerprints corresponding to packets before and after the lost packet from the second storage unit 155.

The first retransmission unit 153 then generates, with the retrieved digital fingerprints, the packet loss petition message that is sent to the second retransmission unit 132. The petition message comprises two short sequences of bits, corresponding to some identifiers before and after the lost packet.

Once the message is received by the second retransmission unit 132, the latter searches the lost packets on the basis of the labels received in the petition message, it extracts the lost packets from the third buffer 133 and it generates with these same packets a second data stream that is sent over the IP network 11 to the first retransmission unit 153 over the communications channel established on the IP network 11.

To summarize, the submitted petition message is sent to the second retransmission unit 132 so that the latter will complete the process of finding a predetermined number of packets of the first transport stream, based on the information provided in the petition message, such that the server 13 generates and transmits a second data stream, including the lost packets, in unicast mode and at the highest bit rate allowed by the communication channel established between the first input/output unit 151 of the customer device 15 and the second input/output unit 131 of the server 13 via the second IP network 11.

Once the first retransmission unit 153 has received the second data stream, it forwards it to the decoder 152 so that it can decode the received packets and can supply the complete decoded contents to the receiver 16 from the second storage unit 155.

In the scenario in which the decoder 152 decodes the second data stream and supplies it to the first buffer 154 before the latter fills up and supplies the corresponding decoded signal to the receiver 16, the subscriber—in this scenario—will not detect any absence of signal in the receiver 16.

The multimedia audiovisual content broadcast procedure, relative to the loss of a packet of a data transport stream requested from the first retransmission unit to the second retransmission unit on a second IP network, can be executed by a computer, loaded into an internal buffer of a computer with input and output units and also with processor units.

To this end, the computer program comprises codes configured to execute the steps of the aforesaid process when it is executed by the computer. Moreover, the executable codes can be recorded onto a legible carrier medium inside a computer.

The invention claimed is:

1. A method for broadcasting digital multimedia contents, the method comprising:
   broadcasting digital media contents from a head end to at least a customer device of a subscriber and to a service server via a first telecommunications network that is other than a telecommunications network based on an Internet IP protocol
   generating, in a customer retransmission unit associated with the customer device, digital fingerprints based on the content of a continuity counter, packetized identifier and first bits of a payload of packets from a first broadcast transport stream received from the head end;
   generating, in a server retransmission unit associated with the service server, digital fingerprints based on the content of a continuity counter, packetized identifier and first bits of a payload from packets of the first broadcast transport stream received from the head end;
   detecting, at the customer device, a gap in a numeric value of a continuity counter associated with packets of the first broadcast transport stream, thereby detecting a lost packet;
   transmitting, from the customer retransmission unit to the server retransmission unit via an Internet protocol telecommunications network, a packet loss petition message including digital fingerprints of several packets correctly received before and after the detected lost packet;
   searching, at the server retransmission unit, for a copy of the lost packet on the basis of the digital fingerprints included in the packet loss petition message, and
   transmitting, from the server retransmission unit, a second digital data stream including a copy of the lost packet to the customer retransmission unit via the Internet protocol telecommunications network.

2. The method of claim 1 wherein the first broadcast transport stream received from the head end at the service server over the first telecommunications network is stored in a server storage unit.

3. The method of claim 2 wherein the digital fingerprints of packets generated by the server retransmission unit are stored in the server storage unit.

4. The method according to claim 1 wherein the digital fingerprints of packets generated by the customer retransmission unit are stored in a customer storage unit.

5. A customer device comprising:
a receiver that is operative to receive a first broadcast transport stream from a head end via a first telecommunications network that is other than a telecommunications network based on an Internet IP protocol; and
at least one processor configured as:
a customer retransmission unit adapted to generate digital fingerprints based on the content of a continuity counter, packetized identifier and first bits of a payload of packets from the first broadcast transport stream.

6. The customer device of claim 5 wherein the at least one processor is configured to:
detect a gap in a numeric value of the continuity counter associated with packets of the first broadcast transport stream, thereby detecting a lost packet; and
transmit a packet loss petition message including the digital fingerprints of several packets correctly received before and after a lost packet to a second retransmission unit over an associated Internet protocol telecommunications network.

7. The customer device of claim 6 comprising:
a customer storage unit that is operative to store the digital fingerprints generated by the customer retransmission.

8. The customer device of claim 7 comprising:
a decoder configured to receive a second digital data stream, including a copy of the lost packet from the second retransmission unit.

9. A service server comprising:
a receiver configured to receive a first broadcast transport stream from a head end via a first telecommunications network that is other than a telecommunications network based on an Internet IP protocol; and
at least one processor configured as:
a server retransmission unit operative to generate digital fingerprints based on the content of a continuity counter, packetized identifier and first bits of a payload of packets from the first broadcast transport stream received from the head end.

10. The server of claim 9 wherein the server retransmission unit is configured to receive a packet loss petition message which includes the digital fingerprints of several packets correctly received before and after a lost packet from an associated customer retransmission unit over an internet protocol telecommunications network.

11. The server of claim 10 comprising:
a server storage unit configured to store the first broadcast transport stream and the digital fingerprints generated by server retransmission unit.

12. The server of claim 10 wherein the server retransmission unit is configured to generate a second digital data stream including a copy of the lost packet and to transmit the second digital data stream to an associated customer retransmission unit over an associated Internet protocol telecommunications network.

13. A non-transitory computer readable medium carrying instruction for at least one processor, which if executed by the at least one processor would provide for the at least one processor to:
generate digital fingerprints based on the content of a continuity counter, packetized identifier and first bits of a payload of packets from a first broadcast transport stream received from a head end via a first telecommunications network that is other than a telecommunications network based on an Internet IP protocol;
receive via an Internet protocol telecommunications network, a packet loss petition message including digital fingerprints of several packets correctly received before and after the lost packet;
search for a copy of the lost packet on the basis of the digital fingerprints included in the packet loss petition message, and
transmitting a second digital data stream including a copy of the lost packet to the customer retransmission unit (153) via the Internet protocol telecommunications network.

* * * * *